(12) United States Patent
Shindo et al.

(10) Patent No.: US 11,034,137 B2
(45) Date of Patent: Jun. 15, 2021

(54) INTERLAYER FILM FOR LAMINATED GLASS, AND LAMINATED GLASS

(71) Applicant: SEKISUI CHEMICAL CO., LTD., Osaka (JP)

(72) Inventors: Kaoru Shindo, Osaka (JP); Yasuharu Nagai, Osaka (JP); Yuji Tanikawa, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 444 days.

(21) Appl. No.: 16/088,783

(22) PCT Filed: Mar. 31, 2017

(86) PCT No.: PCT/JP2017/013712
§ 371 (c)(1),
(2) Date: Sep. 26, 2018

(87) PCT Pub. No.: WO2017/171043
PCT Pub. Date: Oct. 5, 2017

(65) Prior Publication Data
US 2019/0111665 A1     Apr. 18, 2019

(30) Foreign Application Priority Data

Mar. 31, 2016 (JP) .............................. JP2016-070656

(51) Int. Cl.
*B32B 17/10* (2006.01)
*B32B 27/22* (2006.01)
(Continued)

(52) U.S. Cl.
CPC .. *B32B 17/10761* (2013.01); *B32B 17/10036* (2013.01); *B32B 17/10605* (2013.01);
(Continued)

(58) Field of Classification Search
CPC . B32B 17/10761; B32B 27/22; B32B 27/308; C08L 33/04; C08L 29/14
See application file for complete search history.

(56) References Cited

U.S. PATENT DOCUMENTS 3,262,835 A * 7/1966 Mont ..................... C08K 5/098
428/437
4,619,973 A    10/1986 Smith, Jr.
(Continued)

FOREIGN PATENT DOCUMENTS

CN        1993387 A     7/2007
CN      101291809 A    10/2008
(Continued)

OTHER PUBLICATIONS

International Search Report for the Application No. PCT/JP2017/013712 dated Jul. 4, 2017.
(Continued)

*Primary Examiner* — Robert D Harlan
(74) *Attorney, Agent, or Firm* — Cheng Law Group, PLLC

(57) ABSTRACT

Provided is an interlayer film for laminated glass having high Young's modulus, high flexural rigidity, and high sound insulating property. An interlayer film for laminated glass according to the present invention has a one-layer or two or more-layer structure, and includes a first layer including an ionomer resin containing polyvinyl acetal into which an acid group is introduced, or containing a (meth)acrylic resin into which an acid group is introduced, and the ionomer resin has a content of the acid group of 1.5% by mole or more and 10% by mole or less, the ionomer resin has a degree of neutralization of 10% or more and 90% or less, and the first layer has a glass transition point within a temperature range between −20° C. and 0° C. inclusive.

9 Claims, 2 Drawing Sheets

(51) Int. Cl.
  *B32B 27/30* (2006.01)
  *C08L 29/14* (2006.01)
  *C08L 33/04* (2006.01)
  *C08J 5/18* (2006.01)
  *C08L 33/06* (2006.01)
  *B32B 27/08* (2006.01)

(52) U.S. Cl.
  CPC ........ *B32B 17/10743* (2013.01); *B32B 27/08* (2013.01); *B32B 27/22* (2013.01); *B32B 27/30* (2013.01); *B32B 27/308* (2013.01); *C08J 5/18* (2013.01); *C08L 29/14* (2013.01); *C08L 33/04* (2013.01); *C08L 33/062* (2013.01); *B32B 2250/03* (2013.01); *B32B 2250/246* (2013.01); *B32B 2250/40* (2013.01); *B32B 2307/102* (2013.01); *B32B 2307/54* (2013.01); *B32B 2307/546* (2013.01); *B32B 2605/08* (2013.01); *C08J 2329/14* (2013.01)

(56) References Cited

U.S. PATENT DOCUMENTS

| | | | |
|---|---|---|---|
| 4,732,944 | A | 3/1988 | Smith, Jr. |
| 4,906,703 | A | 3/1990 | Bolton et al. |
| 4,968,743 | A | 11/1990 | Misra et al. |
| 4,968,744 | A | 11/1990 | Misra et al. |
| 4,968,745 | A * | 11/1990 | Misra ............... B32B 17/00 525/61 |
| 4,969,744 | A | 11/1990 | Ordell |
| 4,999,078 | A | 3/1991 | Misra et al. |
| 4,999,253 | A | 3/1991 | Misra et al. |
| 5,030,688 | A * | 7/1991 | Misra ............... C08F 8/44 525/61 |
| 2007/0092706 | A1 | 4/2007 | Pesek et al. |
| 2007/0293651 | A1 | 12/2007 | Tada et al. |
| 2010/0227135 | A1 | 9/2010 | Takagi et al. |
| 2012/0094100 | A1 | 4/2012 | Takagi et al. |
| 2013/0157065 | A1 | 6/2013 | Shimamoto et al. |
| 2013/0236711 | A1 | 9/2013 | Lu |
| 2013/0295357 | A1 | 11/2013 | Cleary et al. |
| 2014/0017455 | A1 | 1/2014 | Takagi et al. |
| 2014/0315028 | A1 | 10/2014 | Shimamoto et al. |
| 2017/0015800 | A1 | 1/2017 | Nakajima et al. |

FOREIGN PATENT DOCUMENTS

| | | |
|---|---|---|
| CN | 103003218 A | 3/2013 |
| JP | 57-153064 A | 9/1982 |
| JP | 7-2932 A | 1/1995 |
| JP | 8-295541 A | 11/1996 |
| JP | 11-209150 A | 8/1999 |
| JP | 2007-70200 A | 3/2007 |
| JP | 2009-512763 A | 3/2009 |
| JP | 2012-519646 A | 8/2012 |
| JP | 2014-523389 A | 9/2014 |
| WO | WO-2015/038497 A1 | 3/2015 |
| WO | WO-2015/152239 A1 | 10/2015 |

OTHER PUBLICATIONS

Written Opinion of the International Searching Authority (PCT/ISA/237) for Application No. PCT/JP2017/013712 dated Jul. 4, 2017.
The First Office Action for Application No. 201780017473.4 from The State Intellectual Property Office of the People's Republic of China dated Dec. 2, 2020.
Notification of Reasons for Refusal for the Application No. 2017-518585 from Japan Patent Office dated Dec. 15, 2020.
Supplementary European Search Report for the Application No. EP 17 775 574.1 dated Sep. 6, 2019.

\* cited by examiner

[FIG. 1]
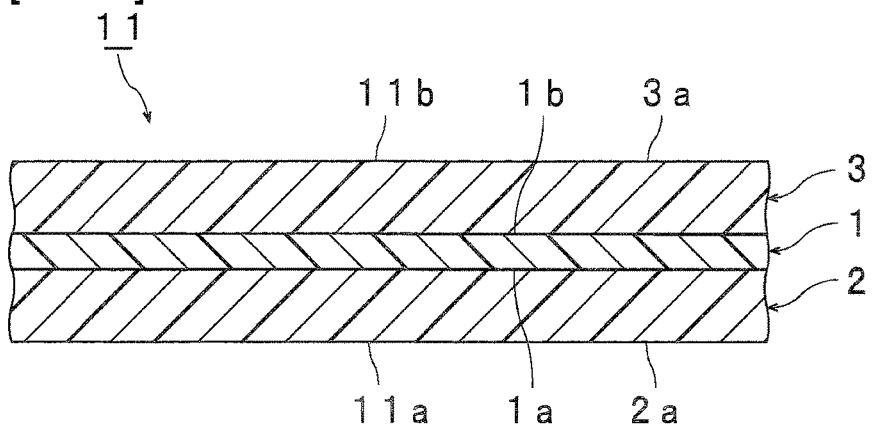
[FIG. 2]
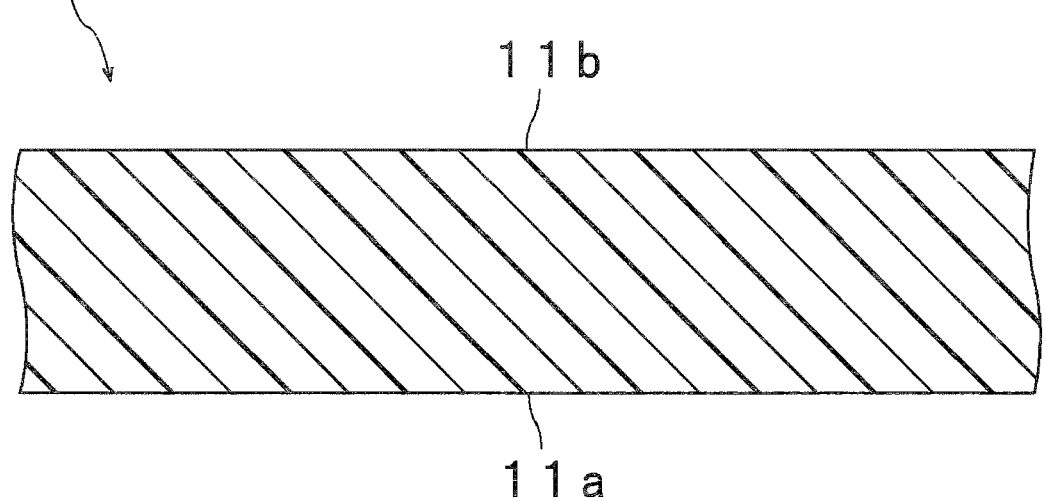
[FIG. 3]
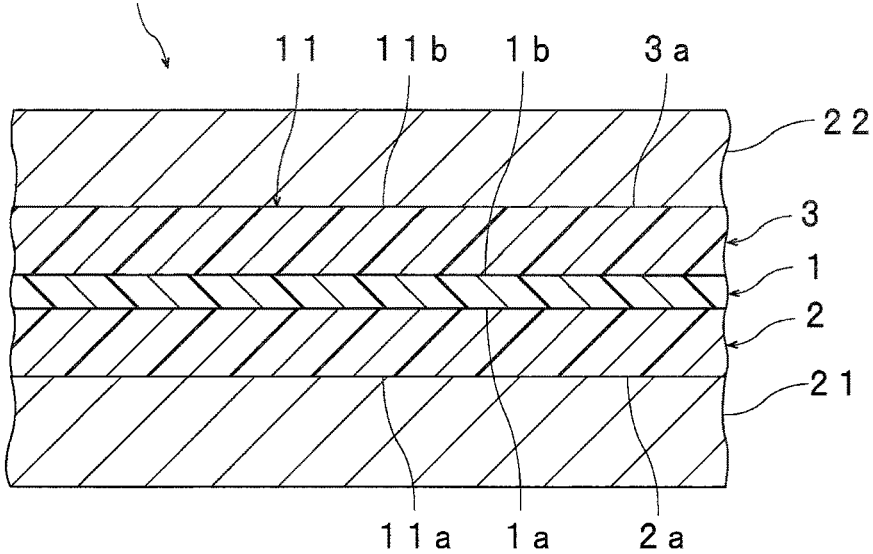

[FIG. 4]
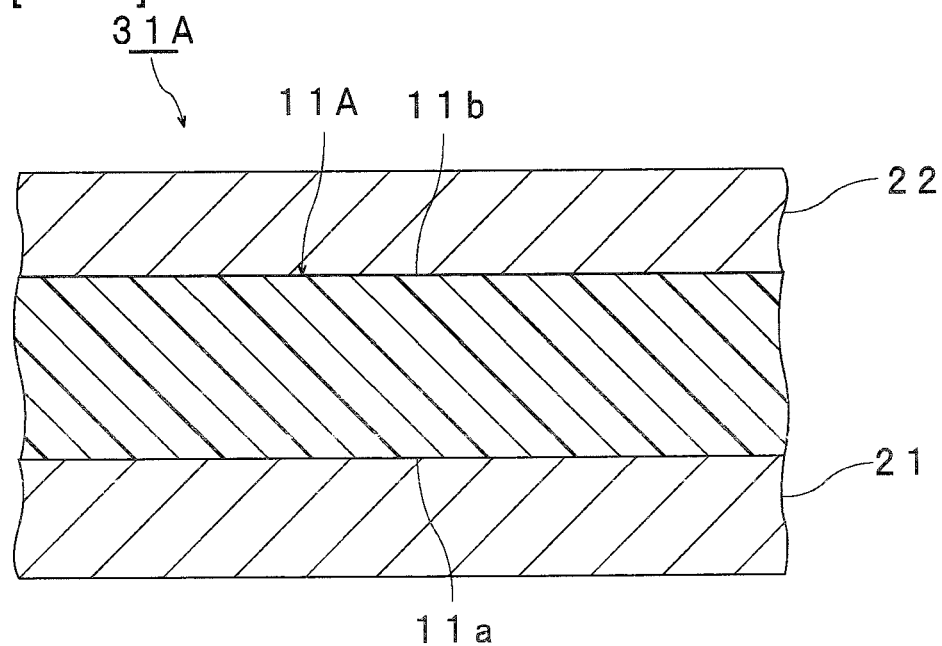
[FIG. 5]
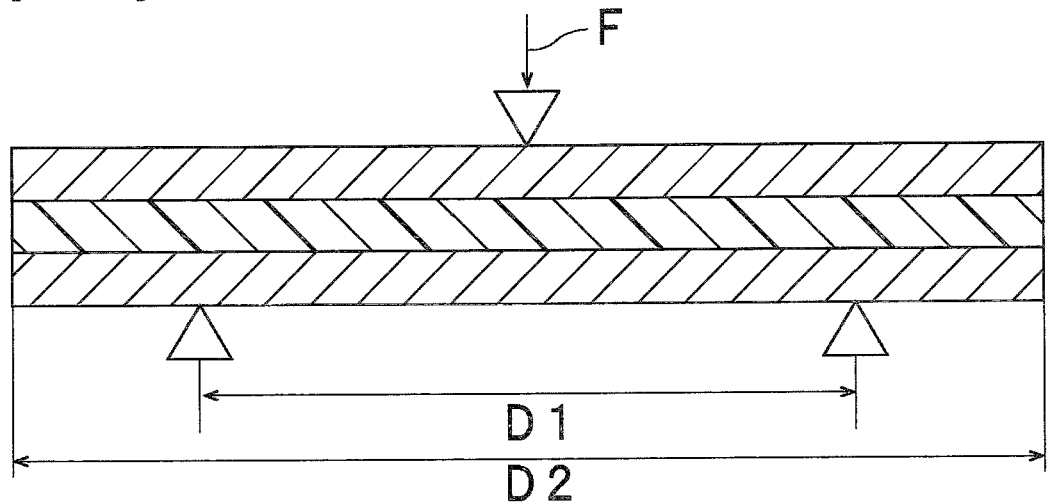

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, the laminated glass is excellent in safety. For that reason, the laminated glass is widely used for automobiles, railway vehicles, aircraft, ships, buildings, and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film which is constituted of a polymer layer having a glass transition temperature of 33° C. or more. Patent Document 2 indicates that the polymer layer is disposed between glass plates having a thickness of 4.0 mm or less.

Patent Document 3 discloses a polyvinyl butyral blend containing a polyvinyl butyral component having a chemically bound ionomer group.

RELATED ART DOCUMENTS

Patent Documents

Patent Document 1: JP 2007-070200 A
Patent Document 2: U.S. 2013/0236711A1
Patent Document 3: U.S. Pat. No. 4,969,744

SUMMARY OF THE INVENTION

Problems to be Solved by the Invention

In conventional interlayer films as described in Patent Documents 1, 2, the Young's modulus may be low, the flexural rigidity may be low, or the sound insulating property may be low. In conventional interlayer films, it is difficult to satisfy all of high Young's modulus, high flexural rigidity, and high sound insulating property.

When a polyvinyl butyral blend according to Patent Document 3 is used for an interlayer film, the Young's modulus is enhanced to some extent, but the flexural rigidity and the sound insulating property are not sometimes sufficiently high.

The present invention is aimed at providing an interlayer film for laminated glass having high Young's modulus, high flexural rigidity, and high sound insulating property. Moreover, the present invention is also aimed at providing laminated glass prepared with the interlayer film for laminated glass.

Means for Solving the Problems

According to a broad aspect of the present invention, there is provided an interlayer film for laminated glass having a one-layer or two or more-layer structure, the interlayer film including a first layer including an ionomer resin containing polyvinyl acetal into which an acid group is introduced, or containing a (meth)acrylic resin into which an acid group is introduced, the ionomer resin having a content of the acid group of 1.5% by mole or more and 10% by mole or less, the ionomer resin having a degree of neutralization of 10% or more and 90% or less, the first layer having a glass transition point within a temperature range between −20° C. and 0° C. inclusive.

It is preferred that the ionomer resin be a polyvinyl acetal ionomer resin or a (meth)acrylic ionomer resin.

It is preferred that the first layer contain a plasticizer.

In a specific aspect of the interlayer film for laminated glass according to the present invention, a content of the plasticizer relative to 100 parts by weight of the ionomer resin is 10 parts by weight or more.

In a specific aspect of the interlayer film for laminated glass according to the present invention, the interlayer film for laminated glass includes a second layer containing a resin, and the second layer is arranged on a first surface side of the first layer.

In a specific aspect of the interlayer film for laminated glass according to the present invention, the interlayer film for laminated glass includes a third layer containing a resin, and the third layer is arranged on a second surface side opposite to the first surface of the first layer.

It is preferred that the second layer contain a plasticizer.
It is preferred that the third layer contain a plasticizer.

It is preferred that the interlayer film for laminated glass according to the present invention be used for obtaining laminated glass by being arranged between a first glass plate having a thickness or 1.3 mm or less, and a second glass plate.

According to a broad aspect of the present invention, there is provided laminated glass including a first lamination glass member, a second lamination glass member, and the interlayer film for laminated glass described above, the interlayer film for laminated glass being arranged between the first lamination glass member and the second lamination glass member.

Effect of the Invention

Since the interlayer film for laminated glass according to the present invention has a one-layer or two or more-layer structure, and includes a first layer including an ionomer resin containing polyvinyl acetal into which an acid group is introduced, or containing a (meth)acrylicresin into which an acid group is introduced, and the ionomer resin has a content of the acid group of 1.5% by mole or more and 10% by mole or less, the ionomer resin has a degree of neutralization of 10% or more and 90% or less, and the first layer has a glass transition point within a temperature range between −20° C. and 0° C., inclusive, it is possible to heighten the Young's modulus, the flexural rigidity, and the sound insulating property.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a schematic view for illustrating a method for measuring flexural rigidity.

MODE(S) FOR CARRYING OUT THE INVENTION

Hereinafter, the present invention will be described in detail.

The interlayer film for laminated glass (sometimes described as the interlayer film) according to the present invention is used for obtaining laminated glass.

The interlayer film according to the present invention has a one-layer structure or a two or more-layer structure. The interlayer film according to the present invention is provided with a first layer containing an ionomer resin. The ionomer resin contains polyvinyl acetal into which an acid group is introduced, or a (meth)acrylic resin into which an acid group is introduced.

The ionomer resin has, for example, a —CH$_2$—CH— group or a —CH$_2$—C(CH$_3$)— group in a main chain. The ionomer resin has, for example, at least one of a —CH$_2$—CH— group and a —CH$_2$—C(CH$_3$)— group in a main chain. The ionomer resin may have one of a —CH$_2$—CH— group and a —CH$_2$—C(CH$_3$)— group in a main chain, or may have both of a —CH$_2$—CH— group and a —CH$_2$—C(CH$_3$)— group in a main chain. In the ionomer resin, it is preferred that a —CH$_2$—CH— group or a —CH$_2$—C(CH$_3$)— group be consecutive in a main chain.

The content of the acid group in the ionomer resin is 1.5% by mole or more and 10% by mole or less. The ionomer resin has a degree of neutralization of 10% or more and 90% or less.

The first layer of the interlayer film according to the present invention has a glass transition point within a temperature range between −20° C. and 0° C., inclusive.

In the present invention, since the above configuration is provided, it is possible to heighten the Young's modulus of the interlayer film, the flexural rigidity of the interlayer film, and the sound insulating property of the interlayer film. In the present invention, it is possible to satisfy all of high Young's modulus, high flexural rigidity, and high sound insulating property.

When the laminated glass is used as window glass, for example, in a side door of an automobile, deformation caused by the low rigidity of the laminated glass can hinder the opening and closing of the window glass because there is no frame for fixing the laminated glass.

In recent years, it is demanded to reduce the thickness of a glass plate so as to reduce the weight of laminated glass. In laminated glass prepared by sandwiching an interlayer film between two glass plates, reduction of the thicknesses of the glass plates disadvantageously makes it extremely difficult to keep the flexural rigidity sufficiently high.

For addressing the aforementioned problem, the present invention can heighten the flexural rigidity of the interlayer film because the above-described configuration is provided.

For example, it is possible to reduce the weight of the laminated glass as long as the flexural rigidity of the laminated glass can be increased owing to the interlayer film even with thin glass plate. When the laminated glass is lightweight, it is possible to reduce the amount of the material for use in the laminated glass, and it is possible to reduce the environmental load. Further, by using the lightweight laminated glass in automobiles, it is possible to improve the fuel efficiency, and as a result, it is possible to reduce the environmental load.

Further, in the present invention, since the above-described configuration is provided, it is possible to increase the formability of the interlayer film. For example, since the interlayer film has appropriate flexibility and appropriate hardness, it is possible to prepare laminated glass neatly without deformation during autoclaving for obtaining the laminated glass.

Further, in the present invention, since the above-described configuration is provided, it is possible to heighten the penetration resistance of the interlayer film and the laminated glass.

From the view point of further improving the Young's modulus, the flexural rigidity, the sound insulating property, and the penetration resistance, it is preferred that the ionomer resin be a polyvinyl acetal ionomer resin or a (meth)acrylic ionomer resin. The polyvinyl acetal ionomer resin is an ionomerized polyvinyl acetal resin. The (meth)acrylic ionomer resin is an ionomerized (meth)acrylic resin.

The polyvinyl acetal ionomer resin has a polyvinyl acetal skeleton. The polyvinyl acetal skeleton has, for example, a —CH$_2$—CH— group in a main chain. To the "—CH—" moiety in a —CH$_2$—CH— group, one other group is bound.

The (meth)acrylic ionomer resin has a (meth)acryl skeleton. The (meth)acryl skeleton has, for example, a —CH$_2$—CH— group or a —CH$_2$—C(CH$_3$)— group in a main chain. To the carbon atom, in the "—CH—" moiety in a —CH$_2$—CH— group, another group is bound. To the carbon atom in the "—C(CH$_3$)—" moiety in a —CH$_2$—C(CH$_3$)— group, one other group is bound.

Examples of the method for producing the polyvinyl acetal ionomer resin include a method including copolymerization of polyvinyl acetate and a monomer having a group that can become an acid group, saponification, acetalization with an aldehyde, and ionomerization, a method including acetalization of polyvinyl alcohol (PVA) with an aldehyde having a group that can become an acid group, and ionomerization, and a method including acetalization of polyvinyl acetal with an aldehyde having group that can become an acid group, and ionomerization.

The polyvinyl alcohol can be obtained, for example, by saponifying polyvinyl acetate. The saponification degree of the polyvinyl alcohol generally falls within the range of 70 to 99.9% by mole.

Examples of the group that can become an acid group include groups derived from a carboxyl group, groups derived from a sulfonic group, and groups derived from a phosphoric group. From the view point of further improving the productivity in production of polyvinyl acetal into which an acid group is introduced, the group that can become an acid group is preferably a group derived from a carboxyl group or a group derived from a sulfonic group, more preferably a group derived from a carboxyl group.

Examples of the acid for introducing an acid group include carboxylic acid, sulfonic acid, and phosphoric acid. From the view point of further improving the productivity in production of polyvinyl acetal into which an acid group is introduced, the acid is preferably carboxylic acid or sulfonic acid, more preferably carboxylic acid. In the polyvinyl acetal ionomer resin, it is preferred that an acid group be introduced by the above acid.

Examples of the monomer having a group that can become an acid group include (meth)acrylic acid, 2-acryloyloxy ethyl acid phosphate and 2-acryloyloxy ethyl-succinic acid.

Examples of the aldehyde that can become an acid group include terephthalic aldehyde acid, glyoxylic acid, and levulinic acid.

Examples of the method for ionomerization include a method of adding a metal-containing compound into a solution, and a method of adding a metal-containing compound during kneading. The metal-containing compound may be added in a state of a solution.

It is preferred that the metal-containing compound be a metal salt or a metal oxide.

Examples of the metal in the metal-containing compound include, but are not particularly limited to, alkali metals, alkali earth metals and transition metals. From the view point of further improving the Young's modulus and the formability, Na, Li, K, Mg, Zn, Cu, Co, Al, Fe, Ni, Cr or Mn is preferred. It is preferred that the polyvinyl acetal ionomer resin contain Na, Zn, Mg or K. It is preferred that the above metal be used for ionomerization. It is particularly preferred that Na be used.

The content of the acid group in the ionomer resin is 1.5% by mole or more and 10% by mole or less. By setting the content of the acid group to the above-described lower limit or more and the above-described upper limit or less, the effect of the present invention is exerted, and in particular, the Young's modulus, the flexural rigidity, the sound insulating property, and the formability are enhanced, and also the tensile elongation and the shock resistance are enhanced. A content of the acid group is preferably 1.8% by mole or more, more preferably 2% by mole or more and is preferably 7% by mole or less, more preferably 5% by mole or less. When the content of the acid group is the above-described lower limit or more, the Young's modulus, the flexural rigidity, the tensile elongation, and the shock resistance are further improved. When the content of the acid group is the above-described upper limit or less, the sound insulating property and the formability are further improved.

The content of the acid group can be determined by using NMR or FT-IR, or the like. Specifically, the content of the acid group can be determined by conducting measurement with an apparatus "NICOLET 6700" (available from Thermo Fisher Scientific Inc.) at a measurement wavelength of 4000 to 400 $cm^{-1}$ with a scanning number of times of 32, and calculating the content of the acid group on the basis of the peak from each acid group and the peak from the salt of each acid. For example, in the case of carboxylic acid, a content of the carboxyl group can be calculated from carbonyl of carboxylic acid (C=O: 1697 $cm^{-1}$), and carboxylate (approximately 1500 to 1600 $cm^{-1}$).

The polyvinyl acetal ionomer resin has a degree of neutralization of 10% or more and 90% or less. By setting the degree of neutralization to the above-described lower limit or more and the above-described upper limit or less, the effect of the present invention is exerted, and in particular, the Young's modulus, the tensile elongation, the flexural rigidity, and the formability are enhanced. The degree of neutralization is preferably 13% or more, more preferably 15% or more and is preferably 70% or less, more preferably 60% or less. When the degree of neutralization is the above-described lower limit or more, the Young's modulus, the flexural rigidity, the tensile elongation, and the shock resistance are further improved. When the degree of neutralization is the above-described upper limit or less, the sound insulating property and the formability are further improved.

The degree of neutralization can be determined by using FT-IR or the like. In FT-IR, it is possible to calculate a degree of neutralization, for example, from the height of the signal of the carboxyl group (1715 $cm^{-1}$), and the height of the signal of the metal base of the carboxyl group (different depending on the metal, 1568 $cm^{-1}$ in the case of Zn, 1550 $cm^{-1}$ in the case of Na).

The first layer has a glass transition point Tg within a temperature range between −20° C. and 0° C., inclusive. The interlayer film may have a plurality of glass transition points within the range of between −20° C. and 0° C., inclusive. When the Tg is the above-described lower limit or more and the above-described upper limit or less, the temperature can be made to correspond to the coincidence frequency according to the time temperature reduction law, so that the sound insulating property can be improved. Furthermore, since correspondence to higher speed is enabled, the energy absorbency for high-speed shock heightens, and the penetration resistance improves.

As a method for measuring the glass transition point, a method of measuring viscoelasticity by using a viscoelasticity measuring apparatus "DMA+1000" available from Metravib directly after keeping the interlayer film for 12 hours in an environment of room temperature 23±2° C., 25±5% humidity can be recited. It is preferred that the interlayer film be cut out as a piece of 50 mm long and 20 mm wide, and the glass transition temperature be measured in a shear mode in the condition of raising the temperature from −50° C. to 100° C. at a temperature raising speed of 2° C./minute and in the condition of 1 Hz frequency and 0.05% strain.

From the view point of further enhancing the Young's modulus, the shear storage equivalent modulus at 80° C. of the interlayer film is preferably 0.3 MPa or more, more preferably 0.5 MPa or more, further preferably 0.7 MPa or more.

From the view point of further enhancing the formability, the shear storage equivalent modulus at 80° C. is preferably 3.5 MPa or less, more preferably 3 MPa or less, further preferably 2.5 MPa or less.

The shear storage equivalent modulus indicates the shear storage modulus when the multilayer body is regarded as a single layer. In the case of a single layer, the shear storage equivalent modulus indicates the shear storage modulus of the single layer. Regarding the shear storage equivalent modulus, when slipping does not occur between layers, it is possible to measure the shear storage equivalent modulus by subjecting the layer configuration that forms the interlayer film to measurement of the shear storage modulus by a general method for measuring dynamic viscoelasticity.

As a method for measuring the shear storage equivalent modulus, a method of measuring viscoelasticity by using a viscoelasticity measuring apparatus "DMA+1000" available from Metravib directly after keeping the interlayer film for 12 hours in an environment of room temperature 23±2° C., 25±5% humidity can be recited. It is preferred that the interlayer film be cut out as a piece of 50 mm long and 20 mm wide, and the measurement be conducted in a shear mode in the condition of raising the temperature from −50° C. to 100° C. at a temperature raising speed of 2° C./minute, and in the condition of 1 Hz frequency and 0.05% strain.

Shear storage equivalent modulus G'* is determined by the following formula (X).

$$G'^* = (\Sigma_i a_i)/(\Sigma_i a_i/G'_i) \quad \text{Formula (X)}$$

G'i in the above formula (X) indicates a shear storage modulus of the i-th layer in the first layer, and ai indicates the thickness of the i-th layer in the first layer. Σi means calculating the sum of the numerical values of i layers.

The interlayer film according to the present invention has a one-layer structure or a two or more-layer structure. The interlayer film according to the present invention may have a one-layer structure or may have a two or more-layer structure. The interlayer film according to the present invention may have a two-layer structure or may have a three or more-layer structure. The interlayer film according to the present invention may be a single-layered interlayer film or may foe a multi-layered interlayer film.

The interlayer film may be provided only with a first layer, or provided with a second layer in addition to the first layer. It is preferred that the interlayer film be further provided with a second layer. When the interlayer film is provided with the second layer, the second layer is arranged on a first surface side of the first layer.

The interlayer film may be provided with a third layer in addition to the first layer and the second layer. It is preferred that the interlayer film be further provided with a third layer. When the interlayer film is provided with the second layer and the third layer, the third layer is arranged on a second surface side opposite to the first surface of the first layer.

It is preferred that the surface opposite to the first layer side of the second layer be a surface on which a lamination glass member or a glass plate is laminated. It is preferred that the thickness of the glass plate laminated on the second layer be 1.3 mm or less. The second surface that is opposite to the first surface (surface of second layer side) of the first layer may be a surface on which a lamination glass member or a glass plate is laminated. It is preferred that the thickness of the glass plate laminated on the first layer be 1.3 mm or less. It is preferred that the surface opposite to the first layer side of the third layer be a surface on which a lamination glass member or a glass plate is laminated. It is preferred that the thickness of the glass plate laminated on the third layer be 1.3 mm or less.

It is preferred that the interlayer film be used for obtaining laminated glass by being arranged between a first glass plate and a second glass plate. It is preferred that the total of the thickness of the first glass plate and the thickness of the second glass plate be 3 mm or less because the flexural rigidity can be made sufficiently high owing to the interlayer film. It is preferred that the interlayer film be used for obtaining laminated glass by being arranged between a first glass plate and a second glass plate. It is preferred that the interlayer film be used for obtaining laminated glass by being arranged between a first glass plate having a thickness of 1.3 mm or less, and a second glass plate because the flexural rigidity can be made sufficiently high owing to the interlayer film. It is preferred that the interlayer film be used for obtaining laminated glass by being arranged between a first glass plate having a thickness of 1.3 mm or less, and a second glass plate having a thickness of 1.3 mm or less because the flexural rigidity can be made sufficiently high owing to the interlayer film.

Hereinafter, specific embodiments of the present invention will be described with reference to the drawings.

FIG. 1 schematically shows an interlayer film for laminated glass in accordance with a first embodiment of the present invention as a sectional view.

An interlayer film 11 shown in FIG. 1 is a multi-layered interlayer film having a two or more-layer structure. The interlayer film 11 is an interlayer film for laminated glass. The interlayer film 11 is used for obtaining laminated glass. The interlayer film 11 is provided with a first layer 1, a second layer 2, and a third layer 3. The second layer 2 is arranged on a first surface 1a of the first layer 1 to be layered thereon. The third layer 3 is arranged on a second surface 1b at the opposite side of the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged between the second layer 2 and the first layer 1 and between the first layer 1 and the third layer 3, respectively. It is preferred that the second layer 2 and the first layer 1, and the first layer 1 and the third layer 3 be directly layered. Examples of another layer include a layer containing polyethylene terephthalate and the like.

FIG. 2 schematically shows an interlayer film for laminated glass in accordance with a second embodiment of the present invention as a sectional view.

An interlayer film 11A shown in FIG. 2 is a single-layered interlayer film having a one-layer structure. The interlayer film 11A is singly constituted by a first layer. The interlayer film 11A is an interlayer film for laminated glass. The interlayer film 11A is used for obtaining laminated glass.

Hereinafter, other details of the first layer, the second layer, and the third layer which constitute the interlayer film according to the present invention, and other details of each ingredient contained in the first layer, the second layer and the third layer will be described.

Resin

The interlayer film contains an ionomer resin. The first layer contains an ionomer resin. It is preferred that the second layer and the third layer contain a resin. Examples of the resin include thermosetting resins and thermoplastic resins. It is preferred that the ionomer resin be a polyvinyl acetal ionomer resin or a (meth)acrylic ionomer resin. It is preferred that the polyvinyl acetal ionomer resin be a polyvinyl butyral ionomer resin. It is preferred that the polyvinyl acetal resin be a polyvinyl butyral resin. One kind of each of the ionomer resin and the aforementioned resin may be used alone, and two or more kinds thereof may be used in combination.

A weight average molecular weight of the ionomer resin and the above-described resin is preferably 30000 or more, more preferably 100000 or more, further preferably 120000 or more, and is preferably 1500000 or less, more preferably 1300000 or less, further preferably 1200000 or less. When the weight average molecular weight is the above-described lower limit or more and the above-described upper limit or less, it is possible to easily obtain the interlayer film by extrusion molding, and further, an appropriate shear storage equivalent modulus is obtained, and the flexural rigidity and the penetration resistance are further improved.

The weight average molecular weight refers to a weight average molecular weight, calculated on the polystyrene equivalent basis, measured by gel permeation chromatography (GPC).

When a resin other than the ionomer resin is used, the resin is preferably a thermoplastic resin, and is preferably a polyvinyl acetal resin, a (meth)acrylic resin such as an acrylic polymer, an urethane polymer, a silicone polymer, rubber, or vinyl acetate polymer, and is more preferably a polyvinyl acetal resin or a (meth)acrylic resin, and is further preferably a polyvinyl acetal resin. By using the polyvinyl acetal resin, the toughness is effectively enhanced, and the penetration resistance is further enhanced.

It is preferred that the resin have a polar group, and the resin have a hydroxyl group. Existence of such a group further heightens the adhesivity between the interlayer film and the lamination glass member, and further heightens the flexural rigidity and the penetration resistance.

It is preferred that the acrylic polymer be a polymer of a polymerizing component including a (meth)acrylic ester. It is preferred that the acrylic polymer be a poly(meth)acrylic ester.

The poly(meth)acrylic ester is not particularly limited. Examples of the poly(meth)acrylic ester include poly(methyl (meth)acrylate), poly(ethyl (meth)acrylate), poly(n-propyl (meth)acrylate), poly(i-propyl (meth)acrylate), poly (n-butyl (meth)acrylate), poly(i-butyl (meth)acrylate), poly (t-butyl (meth)acrylate), poly(2-ethylhexyl (meth)acrylate), poly(octyl (meth)acrylate), poly(propyl (meth)acrylate), poly(2-ethyloctyl (meth)acrylate), poly(nonyl (meth)acrylate), poly(isononyl (meth)acrylate), poly(decyl (meth)acrylate), poly(isodecyl (meth)acrylate), poly(2-hydroxyethyl (meth)acrylate), poly(4-hydroxybutyl (meth)acrylate), poly (lauryl (meth)acrylate), poly(isotetradecyl poly(meth)acrylate), poly(cyclohexyl (meth)acrylate), and poly(benzyl (meth)acrylate). For the ease of controlling the temperature at which the loss tangent reaches the maximum value to fall within an appropriate range in the dynamic viscoelasticity spectrum, and for the ease of mixing into the polyvinyl acetal ionomer, a polyacrylic ester is preferred, and poly (ethyl acrylate), poly(n-butyl acrylate), poly(2-hydroxyethyl poly(meth)acrylate), poly(4-hydroxybutyl (meth)acrylate), poly(2-ethylhexyl acrylate) or poly(octyl acrylate) is more preferred. It is preferred that the interlayer film contain such a preferable acrylic polymer. By using such a preferable poly(meth)acrylic ester, the balance of the productivity of the interlayer film and the characteristics of the interlayer film is further improved. One kind of the poly(meth)acrylic ester may be used alone, and two or more kinds thereof may be used in combination.

The first layer preferably contains a thermoplastic resin (hereinafter, sometimes described as the thermoplastic resin (1)), preferably contains as the thermoplastic resin (1), an ionomer resin (hereinafter, sometimes described as the ionomer resin (1)), more preferably contains, as the thermoplastic resin (1), a polyvinyl acetal ionomer resin (hereinafter, sometimes described as the polyvinyl acetal ionomer resin (1)). The second layer preferably contains a thermoplastic resin (hereinafter, sometimes described as the thermoplastic resin (2)), preferably contains as the thermoplastic resin (2), a polyvinyl acetal resin (hereinafter, sometimes described as the polyvinyl acetal resin (2)), more preferably contains as the thermoplastic resin (2), an ionomer resin (hereinafter, sometimes described as the ionomer resin (2)), and further preferably contains a polyvinyl acetal ionomer resin (hereinafter, sometimes described as the polyvinyl acetal ionomer resin (2)). The third layer preferably contains a thermoplastic resin (hereinafter, sometimes described as the thermoplastic resin (3)), preferably contains as the thermoplastic resin (3), a polyvinyl acetal resin (hereinafter, sometimes described as the polyvinyl acetal resin (3)), more preferably contains as the thermoplastic resin (3) an ionomer resin (hereinafter, sometimes described as the ionomer resin (3)), and further preferably contains as the thermoplastic resin (3) a polyvinyl, acetal ionomer resin (hereinafter, sometimes described as the polyvinyl acetal ionomer resin (3)).

Examples of the thermoplastic resin include a polyvinyl acetal resin, a (meth)acrylic resin, a vinyl acetate copolymer, an ethylene-vinyl acetate copolymer resin, an ethylene-acrylate copolymer resin, a polyurethane resin, a polyvinyl alcohol resin, and the like. Thermoplastic resins other than these may be used.

The polyvinyl acetal ionomer resin and the polyvinyl acetal resin can be produced, for example, by acetalizing polyvinyl alcohol with an aldehyde. It is preferred that the polyvinyl acetal ionomer resin and the polyvinyl acetal resin be an acetalized product of polyvinyl alcohol. The polyvinyl alcohol can be obtained, for example, by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, particularly preferably 2600 or more, and most preferably 2700 or more and is preferably 5000 or less, more preferably 4000 or less, and further preferably 3500 or less. When the average polymerization degree is the above-described lower limit or more, the penetration resistance of laminated glass is further enhanced. When the average polymerization degree is the above-described upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin fall within the range of 2 to 10 and it is more preferred that the number of carbon atoms of the acetal group fall within the range of 2 to 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (the amount of hydroxyl groups) of the polyvinyl acetal resin (1) and the polyvinyl acetal ionomer resin (1) is preferably 3% by mole or more, more preferably 5% by mole or more, and further preferably 7% by mole or more and is preferably 40% by mole or less, more preferably 35% by mole or less. When the content of the hydroxyl group is the above-described lower limit or more, the mechanical strength of the interlayer film is further enhanced. In particular, when the content of the hydroxyl group of the polyvinyl acetal resin (1) and the polyvinyl acetal ionomer resin (1) is 25% by mole or more, the reaction efficiency is high, and the productivity is excellent, and when the content of the hydroxyl group is 35% by mole or less, ionomer can be formed effectively, and not only the flexural rigidity and the penetration resistance are effectively enhanced, but also the sound insulating property of the laminated glass is further enhanced. Moreover, when the content of the hydroxyl group is the above upper limit or less, the flexibility of the interlayer film is enhanced and the handling of the interlayer film is facilitated.

The content of the hydroxyl group of each of the polyvinyl acetal resin(2), the polyvinyl acetal ionomer resin(2), the polyvinyl acetal resin(3) and the polyvinyl acetal ionomer resin(3) is preferably 10% by mole or more, more preferably 13% by mole or more, more preferably 15% by mole or more, still more preferably 18% by mole or more, further preferably 20% by mole or more, particularly preferably 22% by mole or more, and is preferably 37% by mole or less, more preferably 36.5% by mole or less, further preferably 36% by mole or less. When the content of the hydroxyl group is the above-described lower limit or more, the flexural rigidity is further enhanced, and the adhesive force of the interlayer film is further enhanced. In particular, when the content of the hydroxyl group of each of the polyvinyl acetal resin (2), the polyvinyl acetal ionomer resin (2), the polyvinyl acetal resin (3) and the polyvinyl acetal ionomer resin (3) is 10% by mole or more, the reaction efficiency is high, and the productivity is excellent, and when the content of the hydroxyl group is 37% by mole or less, ionomer can be formed effectively, and elongation at break and the flexural rigidity are effectively enhanced. Moreover, when the content of the hydroxyl group is the above upper limit or less, the flexibility of the interlayer film is enhanced and the handling of the interlayer film is facilitated.

From the view point of further enhancing the sound insulating property, it is preferred that the content of the hydroxyl group in the polyvinyl acetal resin (1) and the polyvinyl acetal ionomer resin (1) be lower than the content of the hydroxyl group of the polyvinyl acetal resin (2), the polyvinyl acetal ionomer resin (2), the polyvinyl acetal resin (3), and the polyvinyl acetal ionomer resin (3). From the viewpoint of still further enhancing the sound insulating property, an absolute value of the difference between the content of the hydroxyl group of the polyvinyl acetal resin (1) and the polyvinyl acetal ionomer resin (1) and the content of the hydroxyl group of the polyvinyl acetal resin (2), the polyvinyl acetal ionomer resin (2), the polyvinyl acetal resin (3), and the polyvinyl acetal ionomer resin (3) is preferably 1% by mole or more, more preferably 5% by mole or more, further preferably 9% by mole or more, particularly preferably 10% by mole or more and most preferably 12% by mole or more. It is preferred that an absolute value of the difference between the content, of the hydroxyl group in the polyvinyl acetal resin (1) and the polyvinyl acetal ionomer resin (1) and the content of the hydroxyl group of the polyvinyl acetal resin (2), the polyvinyl acetal ionomer resin (2), the polyvinyl acetal resin (3) and the polyvinyl acetal ionomer resin (3) be 20% by mole or less.

The content of the hydroxyl group is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) and the polyvinyl acetal ionomer resin (1) is preferably 0.05% by mole or more, more preferably 0.1% by mole or more, further preferably 1% by mole or more and is preferably 25% by mole or less, more preferably 30% by mole or less, and further preferably 20% by mole or less. When the acetylation degree is the above-described lower limit or more, the compatibility between the resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) and the polyvinyl acetal ionomer resin (1) is 0.1% by mole or more and 25% by mole or less, the penetration resistance is excellent.

The acetylation degree of each of the polyvinyl acetal resin (2), the polyvinyl acetal ionomer resin (2), the polyvinyl acetal resin (3) and the polyvinyl acetal ionomer resin (3) is preferably 0.01% by mole or more, more preferably 0.5% by mole or more and is preferably 10% by mole or less, more preferably 2% by mole or less. When the acetylation degree is the above-described lower limit or more, the compatibility between the resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree (butyralization degree in the case of polyvinyl butyral resin) of the polyvinyl acetal resin (1) and the polyvinyl acetal ionomer resin (1) is preferably 45% by mole or more, more preferably 50% by mole or more, further preferably 55% by mole or more and is preferably 90% by mole or less, more preferably 80% by mole or less, further preferably 70% by mole or less. When the acetalization degree is the above-described lower limit or more, the compatibility between the resin and a plasticizer is enhanced. When the acetalization degree is the above-described upper limit or less, the reaction time required for producing the polyvinyl acetal resin is shortened.

The acetalization degree (butyralization degree in the case of polyvinyl butyral resin) of each of the polyvinyl acetal resin (2), the polyvinyl acetal ionomer resin (2), the polyvinyl acetal resin (3) and the polyvinyl acetal ionomer resin (3) is preferably 55% by mole or more, more preferably 60% by mole or more and is preferably 75% by mole or less, more preferably 71% by mole or less. When the acetalization degree is the above-described lower limit or more, the compatibility between the resin and a plasticizer is enhanced. When the acetalization degree is the above-described upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When a polyvinyl butyral ionomer resin or a polyvinyl butyral resin is used, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Plasticizer

It is preferred that the interlayer film contain a plasticizer. It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer, and further by using a polyvinyl acetal resin and a plasticizer together, the adhesive force of a layer containing the polyvinyl acetal resin and the plasticizer to a lamination glass member or another layer is moderately enhanced. The plasticizer is not particularly limited. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

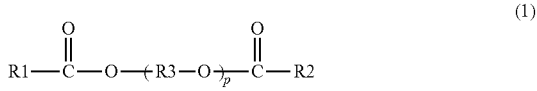

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the interlayer film, a content of the plasticizer relative to 100 parts by weight of the ionomer resin is preferably 10 parts by weight or more, more preferably 20 parts by weight or more, further preferably 30 parts by weight or more, and is preferably 90 parts by weight or less, more preferably 85 parts by weight or less, further preferably 80 parts by weight or less. When the content is the above-described lower limit or more, the flexibility of the interlayer film is enhanced and the handling of the interlayer film is facilitated. When the content is the above-described upper limit or less, formation of the ionomer is less likely to be hindered, and the flexural rigidity and the penetration resistance of the laminated glass are further enhanced.

Each of the content of the plasticizer (2) relative to 100 parts by weight of the themoplastic resin (2), the polyvinyl acetal resin (2) or the polyvinyl acetal ionomer resin (2) (hereinafter, sometimes described as the content (2)) in the second layer, and the content of the plasticizer (3) relative to 100 parts by weight of the thermoplastic resin (3), the polyvinyl acetal resin (3) or the polyvinyl acetal ionomer resin (3) (hereinafter, sometimes described as the content (3)) in the third layer is preferably 10 parts by weight or more, more preferably 15 parts by weight or more, and is preferably 40 parts by weight or less, more preferably 35 parts by weight or less, further preferably 32 parts by weight or less, particularly preferably 30 parts by weight or less. When the content (2) and the content (3) are the above-described lower limit or more, the flexibility of the interlayer film is enhanced and the handling of the interlayer film is facilitated. When the content (2) and the content (3) are the above-described upper limit or less, formation of the ionomer is less likely to be hindered, and the flexural rigidity and the penetration resistance of the laminated glass are further enhanced.

The content of the plasticizer (1) relative to 100 parts by weight of the thermoplastic resin (1) or the ionomer resin (1) (hereinafter, sometimes described as the content (1)) in the first layer is preferably 10 parts by weight or more, more preferably 20 parts by weight or more, further preferably 30 parts by weight or more and is preferably 90 parts by weight or less, more preferably 85 parts by weight or less, further preferably 80 parts by weight or less. When the content (1) is the above-described lower limit or more, the flexibility of the interlayer film is enhanced and the handling of the interlayer film is facilitated. When the content (1) is the above-described upper limit or less, formation of the ionomer is less likely to be hindered, and the flexural rigidity and the penetration resistance of the laminated glass are further enhanced.

For the purpose of further enhancing the sound insulating property of laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, and further preferably 70 parts by weight or less.

Heat Shielding Compound

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film and in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, and especially preferably 0.02% by weight or more and is preferably 0.2% by weight or less, more preferably 0.1% by weight or less, further preferably 0.05% by weight or less, and especially preferably 0.04% by weight or less. When the content of the Ingredient X is the above-described lower limit or more and the above-described upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and particularly preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, and more preferably 0.02 μm or more and is preferably 0.1 μm or less, and more preferably 0.05 μm or less. When the average particle diameter is the above-described lower limit or more, the heat ray shielding properties are sufficiently enhanced. When the average particle diameter is the above-described upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film and in 100% by weight of a layer containing the heat shielding particles (a first layer, a second layer, or a third layer), each content of the heat shielding particles is preferably 0.01% by weight or more, more preferably 0.1% by weight or more, further preferably 1% by weight or more, especially preferably 1,5% by weight or more, preferably 6% by weight or less, more preferably 5.5% by weight or less, further preferably 4% by weight or less, especially preferably 3.5% by weight or less and most preferably 3% by weight or less. When the content of the heat shielding particles is the above-described lower limit or more and the above-described upper limit or less, the heat shielding properties are sufficiently enhanced and the visible light transmittance is sufficiently enhanced.

Metal Salt

It is preferred that the interlayer film include at least one kind of metal salt (hereinafter, sometimes described as Metal salt M) among a magnesium salt, an alkali metal salt, and an alkaline earth metal salt. It is preferred that the first layer contain the Metal salt M. It is preferred that the second layer contain the Metal salt M. It is preferred that the third layer contain the Metal salt M. It is preferred that the surface layer contain the Metal salt M. By the use of the Metal salt M, controlling the adhesivity between the interlayer film and a lamination glass member or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium, carboxylate with 2 to 16 carbon atoms and the potassium carboxylate with 2 to 16 carbon atoms are not particularly limited, examples thereof include magnesium acetate, potassium acetate, magnesium propionate, potassium, propionate, magnesium 2-ethylbutyrate, potassium 2-ethylbutanoate, magnesium 2-ethylhexanoate, potassium 2-ethylhexanoate, and the like.

The total of the contents of Mg and K in 100% by weight of the interlayer film, and in layers containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above-described lower limit or more and the above-described upper limit or less, the adhesivity between the interlayer film and a lamination glass member or the adhesivity between respective layers in the interlayer film can be further well controlled.

Ultraviolet Ray Screening Agent

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include oxalic acid diamides having a substituted aryl group and the like on the nitrogen atom, such as N-(2-ethylphenyl)-N'-(2-ethoxy-5-t-butylphenyl) oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of the interlayer film and in 100% by weight of a layer containing the ultraviolet ray screening agent (a first layer, a second layer, or a third layer), the content of the ultraviolet, ray screening agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less, and especially preferably 0.8% by weight or less. In particular, by setting the content, of the ultraviolet ray screening agent to 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

Oxidation Inhibitor

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film and in 100% by weight of the layer containing the oxidation inhibitor (a first layer, a second layer or a third layer). Moreover, since an effect commensurate with the addition of the oxidation inhibitor is not attained, it is preferred that the content of the oxidation inhibitor be 2% by weight or less in 100% by weight of the interlayer film and in 100% by weight of the layer containing the oxidation inhibitor.

Other Ingredients

Each of the interlayer film, the first layer, the second layer, and the third layer may contain additives such as a coupling agent containing silicon, aluminum, or titanium, a dispersing agent, a surfactant, a flame retardant, an antistatic agent, a pigment, a dye, a moisture-resistance improving agent, a fluorescent brightening agent, and an infrared ray absorber, as necessary. One kind of these additives may be used alone, and two or more kinds thereof may be used in combination.

Other Details of Interlayer Film for Laminated Glass

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, preferably 3 mm or less and more preferably 1.5 mm or less. When the thickness of the interlayer film is the above lower limit or more, the penetration resistance and the flexural rigidity of laminated glass are enhanced. When the thickness of the interlayer film is the above upper limit or less, the transparency of the interlayer film is further improved.

The thickness of the interlayer film is designated as T. The thickness of the first layer is preferably 0.035 T or more, more preferably 0.0625 T or more, further preferably 0.1 T or more and is preferably 0.4 T or less, more preferably 0.375 T or less, further preferably 0.25 T or less, particularly preferably 0.15 T or less. When the thickness of the first layer is 0.4 T or less, the flexural rigidity is further improved.

The thickness of each of the second layer and the third layer is preferably 0.3 T or more, more preferably 0.3125 T or more, further preferably 0.375 T or more and is preferably 0.97 T or less, more preferably 0.9375 T or less, further preferably 0.9 T or less. The thickness of each of the second layer and the third layer may be 0.46875 T or less, and may be 0.45 T or less. When the thickness of each of the second layer and the third layer is the above-described lower limit or more and the above-described upper limit or less, the rigidity and the sound insulating property of the laminated glass are further enhanced.

A total thickness of the second layer and the third layer is preferably 0.625 T or more, more preferably 0.75 T or more, further preferably 0.85 T or more and is preferably 0.97 T or less, more preferably 0.9375 T or less, further preferably 0.9 T or less. When the total thickness of the second layer and the third layer is the above-described lower limit or more and the above-described upper limit or less, the rigidity and the sound insulating property of the laminated glass are further enhanced.

The interlayer film may be an interlayer film having a uniform thickness, or may be an interlayer film having varying thickness. The sectional shape of the interlayer film may be a rectangular shape and may be a wedge-like shape.

The production method of the interlayer film according to the present invention is not particularly limited. In the case of a single-layered interlayer film, examples of the production method of the interlayer film according to the present invention include a method of extruding a resin composition with an extruder. In the case of a multi-layered interlayer film, examples of the production method of the interlayer film according to the present invention include a method of separately forming resin compositions used for constituting respective layers into respective layers, and then, for example, layering the obtained layers, a method of coextruding resin compositions used for constituting respective layers with an extruder and layering the layers, and the like. A production method of extrusion-molding is preferred because the method is suitable for continuous production.

For the excellent production efficiency of the interlayer film, it is preferred that the second layer and the third layer contain the same polyvinyl acetal resin, it is more preferred that the second layer and the third layer contain the same polyvinyl acetal resin and the same plasticizer, it is preferred that the second layer and the third layer contain the same polyvinyl acetal ionomer resin, it is more preferred that the second layer and the third layer contain the same polyvinyl acetal ionomer resin and the same plasticizer, and it is further preferred that the second layer and the third layer be formed of the same resin composition.

It is preferred that the interlayer film have a protrusions and recesses shape in at least one surface of the surfaces of both sides. It is preferred that the interlayer film have a protrusions and recesses shape in surfaces of both sides. Examples of the method for forming the protrusions and recesses shape include, but are not particularly limited to, a lip emboss method, an emboss roll method, a calender roll method, and a contour extrusion method. The emboss roll method is preferred because a large number of embosses of the protrusions and recesses shape, which is a quantitatively constant protrusions and recesses pattern, can be formed.

Laminated Glass

FIG. 3 is a sectional view schematically showing an example of laminated glass prepared with the interlayer film for laminated glass shown in FIG. 1.

A laminated glass 31 shown in FIG. 3 is provided with a first lamination glass member 21, a second lamination glass member 22, and the interlayer film 11. The interlayer film 11 is arranged between the first lamination glass member 21 and the second lamination glass member 22, to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of a third layer 3.

FIG. 4 is a sectional view schematically showing an example of laminated glass prepared with the interlayer film for laminated glass shown in FIG. 2.

A laminated glass 31A shown in FIG. 4 is provided with the first lamination glass member 21, the second lamination glass member 22, and the interlayer film 11A. The interlayer film 11A is arranged between the first lamination glass member 21 and the second lamination glass member 22, to be sandwiched therebetween.

The first lamination glass member 21 is layered on a first surface 11a of the interlayer film 11A. The second lamination glass member 22 is layered on a second surface 11b opposite to the first surface 11a of the interlayer film 11A.

As described above, the laminated glass according to the present invention is provided with a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

It is preferred that the first lamination glass member be the first glass plate. It is preferred that the second lamination glass member be the second glass plate.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and preferably 0.5 mm or less.

By using the interlayer film according to the present invention, it is possible to keep the flexural rigidity of the laminated glass high even when the thickness of the laminated glass is small. From the view point of lightening the laminated glass, lessening the material of the laminated glass to reduce the environmental load, and improving the fuel consumption of automobiles by lightening of the laminated glass to reduce the environmental load, the thickness of the glass plate is preferably 2 mm or less, more preferably 1.8 mm or less, still more preferably 1.5 mm or less, further preferably 1.3 mm or less, still further preferably 1.0 mm or less, particularly preferably 0.7 mm or less. From the view point of lightening the laminated glass, lessening the material of the laminated glass to reduce the environmental load, and improving the fuel consumption of automobiles by lightening of the laminated glass to reduce the environmental load, a sum of the thickness of the first glass plate and the thickness of the second glass plate is preferably 3.2 mm or less, more preferably 3 mm or less, further preferably 2.8 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed to obtain a laminate. Then, the laminate is preliminarily bonded at about 70 to 110° C. to obtain a preliminarily bonded body. Next, by putting the preliminarily bonded body into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, or roof glass of an automobile, and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

The following materials were prepared.

Polyvinyl Acetal Resin, Polyvinyl Acetal Ionomer Resin

The polyvinyl acetal resins and the polyvinyl acetal ionomer resins shown in the following Tables 1, 2 were appropriately used. In all of the polyvinyl acetal resins and polyvinyl acetal ionomer resins used, n-butyraldehyde which has 4 carbon atoms is used for the acetalization. Regarding the polyvinyl acetal ionomer resin, specifically the polyvinyl acetal ionomer resin used Example 1 is obtained in the following manner.

Introduction of group that can become an ionic functional group by post acetalization, and ionomerization In a reaction vessel equipped with a thermometer, a stirrer, a nitrogen introducing tube, and a condenser, 20 parts by weight of polyvinyl butyral (average degree of polymerization: 1700, butyralization degree: 66.2% by mole, content of the hydroxyl group: 22.6% by mole, acetylation degree: 11.2% by mole), and 100 parts by weight of methanol were added, and polyvinyl butyral was dissolved under stirring. Next, terephthalic aldehyde acid was added, and dissolved, and then 0.1 parts by weight of 35 wt % hydrochloric acid was added, and heated to 60° C. under stirring in a reaction vessel. The elevation of the temperature was followed by reaction at 60° C. for 2 hours.

Then, by cooling the reaction liquid, a solution having solid content of 20% by weight containing a polyvinyl acetal resin having a group that can become an ionic functional group was obtained. To the obtained solution sodium methoxide was added so that the degree of neutralization was the value shown in Tables 1, 2. The degree of neutralization was calculated from the heights of signals of a carboxyl group ($1715\ cm^{-1}$) and a metal base of carboxyl group ($1550\ cm^{-1}$ in the case of Na), measured by using an FTIR apparatus "NICOLET 6700" (available from Thermo Fisher Scientific Inc.) at a measurement wavelength ranging from 4000 to 400 $cm^{-1}$, with a scanning number of times of 32.

The obtained polyvinyl acetal resin having a group that can become an ionic functional group was dissolved in dimethyl sulfoxide-d6, and subjected to measurement of proton NMR, and thus a composition after the reaction was calculated.

(Meth)Acrylic Ionomer Resin (Meth)acrylic ionomer resins shown in the following Tables 1, 2 were appropriately used. Specifically, the (meth)acrylic ionomer resin is obtained in the following manner. Regarding the (meth)acrylic resins and the (meth)acrylic ionomer resins shown in the following Tables 1, 2, an acrylic polymer obtained by polymerizing a polymerizable component containing ethyl acrylate and acrylic acid in contents as shown in the following Tables 1, 2 is used.

In a reaction vessel equipped with a thermometer, a stirrer, a nitrogen introducing tube, and a condenser, 97 parts by weight of ethyl acrylate, 3 parts by weight of acrylic acid, and 100 parts by weight of ethyl acetate were added, and the interior of the reaction vessel was replaced by nitrogen by blowing nitrogen gas into the reaction vessel for 30 minutes, and then the interior of the reaction vessel was heated to 75° C. under stirring. After 30 minutes, 0.1 parts by weight of t-hexylperoxy pivalate as a polymerization initiator was added dropwise into the reaction vessel over 5 hours. Then the reaction was caused for 3 hours at 75° C.

Then, by cooling the reaction liquid, a solution having solid contents of 20% by weight containing an acryl resin having a group that can become an ionic functional group was obtained. To the obtained solution sodium methoxide was added so that the degree of neutralization was the value shown in Tables 1, 2. The degree of neutralization was calculated from the heights of signals of a carboxyl group ($1715\ cm^{-1}$) and a metal base of carboxyl group ($1550\ cm^{-1}$ in the case of Na), measured by using an FTIR apparatus "NICOLET 6700" (available from Thermo Fisher Scientific Inc.) at a measurement wavelength ranging from 4000 to 400 $cm^{-1}$, with a scanning number of times of 32.

The obtained acryl resin having a group that can become an ionic functional group was dissolved in dimethyl sulfoxide-d6, and subjected to measurement of proton NMR, and thus a composition after the reaction was calculated.

Plasticizer

Triethylene glycol di-2-ethylhexanoate (3GO)

Ultraviolet Ray Screening Agent

Tinuvin 326 (2-(2'-hydroxy-3'-t-butyl-5-methylphenyl)-5-chlorobenzotriazole, "Tinuvin 326" available from BASF Japan Ltd.)

Oxidation Inhibitor

BHT (2,6-di-t-butyl-p-cresol)

Example 1 and Comparative Example 1

Preparation of Composition for Forming Interlayer Film (First Layer):

A polyvinyl acetal ionomer resin of a kind shown in the following Tables 1, 2, a plasticizer (3GO), 0.2 parts by weight of an ultraviolet ray screening agent (Tinuvin 326) and an oxidation inhibitor (BHT) were mixed to obtain a composition for forming an interlayer film. The plasticizer was used in an amount shown in the following Table 1, relative to 100 parts by weight of the polyvinyl acetal ionomer resin. The ultraviolet ray screening agent and the oxidation inhibitor were used in an amount of 0.2 parts by weight, relative to 100 parts by weight of the polyvinyl acetal resin or the polyvinyl acetal ionomer resin.

Preparation of Interlayer Film:

By extruding the composition for forming an interlayer film with an extruder, an interlayer film (first layer) having a thickness shown in the following Tables 1, 2 was prepared.

Preparation of Laminated Glass:

(For Measurement of Flexural Rigidity)

The obtained interlayer film was cut into a size of 20 cm long×2.5 cm wide. As the first lamination glass member and the second lamination glass member, two glass plates (clear float glass, 20 cm long×2.5 cm wide, 1.2 mm thick) having thicknesses shown in the following Tables 1, 2 were prepared. The obtained interlayer film was sandwiched between the two glass plates to obtain a laminate. The obtained laminate was put into a rubber bag, and the bag was degassed for 20 minutes with a degree of vacuum of 2660 Pa (20 torr). The laminate in a degassed condition was then vacuum pressed while the laminate was retained in an autoclave at 90° C. for 30 minutes. The laminate preliminarily press-bonded in this manner was subjected to press-bonding for 20 minutes under conditions of 135° C. and a pressure of 1.2 MPa (12 $kg/cm^2$) in an autoclave to obtain a sheet of laminated glass.

(For Measurement of Penetration Resistance)

The obtained interlayer film was cut into a size of 15 cm long×15 cm widen. As the first lamination glass member and the second lamination glass member, two glass plates (clear float glass, 15 cm long×15 cm wide, 1.2 mm thick) having thicknesses shown in the following Tables 1, 2 were prepared. The interlayer film was sandwiched between the two glass plates to obtain a laminate. The laminate was put into a rubber bag and the interior of the bag was degassed for 20 minutes with a degree of vacuum of 2.6 kPa, after which the laminate in the degassed condition was transferred into an oven, and held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass.

Examples 2 to 4 and Comparative Examples 2 to 4

Preparation of Composition for Forming First Layer:

A polyvinyl acetal ionomer resin, or a (meth)acrylic ionomer resin of a kind shown in the following Table 1, a plasticizer (3GO), an ultraviolet ray screening agent (Tinuvin 326) and an oxidation inhibitor (BHT) were mixed to obtain a composition for forming a first layer. The plasticizer was used in an amount shown in the following Tables 1, 2, relative to 100 parts by weight of the polyvinyl acetal ionomer resin or the (meth)acrylic ionomer resin. The ultraviolet ray screening agent and the oxidation inhibitor were used in an amount of 0.2 parts by weight, relative to 100 parts by weight of the polyvinyl acetal ionomer resin or the (meth)acrylic ionomer resin.

Preparation of Composition for Forming Second Layer and Third Layer:

A polyvinyl acetal resin of a kind shown in the following Table 1, a plasticizer (3GO), an ultraviolet ray screening agent (Tinuvin 326) and an oxidation inhibitor (BHT) were mixed to obtain a composition for forming a second layer and a third layer. The ultraviolet ray screening agent and the oxidation inhibitor were used in an amount of 0.2 parts by weight, relative to 100 parts by weight of the polyvinyl acetal resin.

Preparation of Interlayer Film:

By coextruding the composition for forming a first layer and the composition for forming a second layer and a third layer using a coextruder, an interlayer film having a thickness as shown in the following Table 1 and a layered structure with a stack of a first layer/a second layer/a third layer was prepared.

Preparation of Laminated Glass:

Laminated glass was prepared with the obtained interlayer film in the same manner as in Example 1.

Evaluation (1) Viscoelasticity

Measurement of Glass Transition Point and Shear Storage Equivalent Modulus:

The obtained first layer was cut out into a piece of 50 mm long and 20 mm wide. The interlayer film was stored for 12 hours in an environment of 23±2° C. temperature, 25±5% humidity. Directly after storage, the interlayer film was subjected to measurement by using a viscoelasticity measuring apparatus "DMA+1000" available from Metravib in a shear mode from −50° C. to 100° C. at a temperature raising speed of 2° C./minute in the condition of 1 Hz frequency and 0.05% strain. A Tan δ peak temperature situated in the range between −30° C. and 0° C. was read as a glass transition point. A viscoelasticity of each layer was measured in the method as described above, and a shear storage equivalent modulus at 20° C. was calculated.

(2) Flexural Rigidity

Flexural rigidity was evaluated by using the obtained laminated glass.

The flexural rigidity was evaluated by the test method that is schematically shown in FIG. 5. As the measuring apparatus, UTA-500 available from ORIENTEC Co., LTD, equipped with a three-point bending test jig, was used. Under measurement conditions of 20° C. (20±3° C.), distance D1 of 12 cm, and distance D2 of 20 cm, deformation was applied to the laminated glass in the direction of F at a displacement speed of 1 mm/minute, and a stress when a displacement of 1.5 mm was applied was measured, and flexural rigidity was calculated. The flexural rigidity was judged according to the following criteria.

[Criteria for Judgment in Flexural Rigidity]
◯: Flexural rigidity is 50 N/mm or more
x: Flexural rigidity is less than 50 N/mm (3) Sound Insulating Property The obtained laminated glass was excited with a vibration generator for damping test ("Vibrator G21-005D" available from Shinken. Co., Ltd.), and the resultant vibration characteristic was amplified with a mechanical impedance measuring device ("XG-81" available from RION Co., Ltd.), and the vibration spectrum was analyzed with a FFT spectrum analyzer ("FFT analyzer HP3582A" available from Yokogawa Hewlett Packard).

From a ratio between a loss factor obtained in this manner and a resonance frequency of the laminated glass, a graph showing the relation between the sound frequency (Hz) and the sound transmission loss (dB) at 10° C. and 20° C. was prepared, and the minimal sound transmission loss (TL value) at a sound frequency around 3,000 to 4000 Hz was determined. The higher the TL value, the more the sound insulating property heightens. The sound insulating property was judged according to the following criteria.

[Criteria for Judgment in Sound Insulating Property]
◯: TL value is 32 dB or more
x: TL value is less than 32 dB (4) Penetration Resistance The obtained laminated glass B was adjusted so that the surface temperature was 23° C. Then, for each of six sheets of laminated glass, a rigid ball having a mass of 2260 g and a diameter of 82 mm was dropped from the height of 1.5 m to the center portion of the laminated glass. When the rigid ball did not penetrate in 5 seconds after collision of the rigid ball for all of the six sheets of laminated glass, the laminated glass was evaluated as acceptable. When the number of sheets of laminated glass through which the rigid ball did not penetrate in 5 seconds after collision of the rigid ball was 3 or less, the laminated, glass was evaluated as unacceptable. When the number of sheets of laminated glass through which the rigid ball did not penetrate in 5 seconds after collision of the rigid ball was 4, separately, another set of six sheets of laminated glass was evaluated for the penetration resistance. When the number of sheets of laminated glass through which the rigid ball did not penetrate in 5 seconds after collision of the rigid ball was 5, one sheet of laminated glass was additionally tested, and when the rigid ball did not penetrate in 5 seconds after collision of the rigid ball, the laminated glass was evaluated as acceptable. In the same manner, while the height was increased in 25 cm increments, and a hard sphere with a mass of 2260 g and a diameter of 82 mm was dropped to the center part of each of six sheets of laminated glass to evaluate the penetration resistance of the laminated glass. The penetration resistance was judged according to the following criteria.

[Criteria for Judgment in Penetration Resistance]
◯: Acceptable even from the height of 2 m
x: Unacceptable from the height of less than 2 m The details and the results are shown in the following Tables 1, 2. In this connection, in Tables 1, 2, the description of the ultraviolet ray screening agent and the oxidation inhibitor was omitted.

TABLE 1

| | | | | Example 1 | Comparative Example 1 | Example 2 | Example 3 |
|---|---|---|---|---|---|---|---|
| Configuration of laminated glass | Thickness of first lamination glass member (mm) | | | 1.8 | 1.8 | 1.8 | 1.8 |
| | Second layer | Polyvinyl acetal resin | Average polymerization degree | — | — | 1700 | 1700 |
| | | | Content of hydroxyl group (mol %) | — | — | 30.6 | 30.6 |
| | | | Acetalization degree (mol %) | — | — | 68.5 | 68.5 |
| | | | Acetylation degree (mol %) | — | — | 0.9 | 0.9 |
| | | | Content (parts by mole) | — | — | 100 | 100 |
| | | Plasticizer | Kind | — | — | 3GO | 3GO |
| | | | Content (parts by mole) | — | — | 30 | 30 |
| | | Thickness (μm) | | — | — | 330 | 330 |
| | First layer | Polyvinyl acetal ionomer resin | Average polymerization degree of PVA | 1700 | 1700 | 1700 | — |
| | | | Content of hydroxyl group (mol %) | 17 | 6.1 | 17 | — |
| | | | Acetalization degree (mol %) | 64 | 60.2 | 64 | — |
| | | | Acetylation degree (mol %) | 11.2 | 12.1 | 11.2 | — |
| | | | Content of acid group (mol %) | 3.9 | 1.2 | 3.9 | — |
| | | | Kind of acid | Carboxylic acid | Carboxylic acid | Carboxylic acid | — |
| | | | Metal species for ionomerization | Na | Na | Na | — |
| | | | Degree of neutralization (%) | 54 | 28 | 32 | — |
| | | | Content (parts by weight) | 100 | 100 | 100 | — |
| | | (Meth)acrylic ionomer resin | Ethyl acrylate (wt %) | — | — | — | 97 |
| | | | Acrylic acid (wt %) | — | — | — | 3 |
| | | | Content of acid group (mol %) | — | — | — | 4 |
| | | | Kind of acid | — | — | — | Carboxylic acid |
| | | | Metal Species for ionomerization | — | — | — | Na |
| | | | Degree of neutralization (%) | — | — | — | 51 |
| | | | Content (parts by weight) | — | — | — | 100 |
| | | Plasticizer | Kind | 3GO | 3GO | 3GO | — |
| | | | Content (parts by weight) | 70 | 70 | 70 | — |
| | | Thickness (μm) | | 1000 | 800 | 100 | 100 |
| | Third layer | Polyvinyl acetal resin | Average polymerization degree | — | — | 1700 | 1700 |
| | | | Content of hydroxyl group (mol %) | — | — | 30.6 | 30.6 |
| | | | Butyralization degree (mol %) | — | — | 68.5 | 68.5 |
| | | | Acetylation degree (mol %) | — | — | 0.9 | 0.9 |
| | | | Content (parts by mole) | — | — | 100 | 100 |
| | | Plasticizer | Kind | — | — | 3GO | 3GO |
| | | | Content (parts by mole) | — | — | 30 | 30 |
| | | Thickness (μm) | | — | — | 330 | 330 |
| | Thickness of second lamination glass member (mm) | | | 2.0 | 2.0 | 1.0 | 1.0 |
| Evaluation | (1) Viscoelasticity | Tg (= tanδ peak temperature) (° C.) | | −2 | −2 | −2 | −4 |
| | | Modulus of elasticity (20° C.) | | 3.3 MPa | 0.4 MPa | 20.6 MPa | 18.9 MPa |
| | (2) Flexural rigidity | Judgement | | ○ | x | ○ | ○ |
| | (3) Sound insulating property | Judgement | | ○ | ○ | ○ | ○ |
| | (4) Penetration resistance | Judgement | | ○ | x | ○ | ○ |

TABLE 2

| | | | | Example 4 | Comparative Example 2 | Comparative Example 3 | Comparative Example 4 |
|---|---|---|---|---|---|---|---|
| Configuration of laminated glass | Thickness of first lamination glass member (mm) | | | 1.8 | 1.8 | 1.8 | 1.8 |
| | Second layer | Polyvinyl acetal resin | Average polymerization degree | 800 | 1700 | 1700 | 1700 |
| | | | Content of hydroxyl group (mol %) | 32.5 | 30.6 | 30.6 | 30.6 |
| | | | Acetalization degree (mol %) | 66.3 | 68.5 | 68.5 | 68.5 |
| | | | Acetylation degree (mol %) | 1.2 | 0.9 | 0.9 | 0.9 |
| | | | Content (parts by mole) | 100 | 100 | 100 | 100 |
| | | Plasticizer | Kind | 3GO | 3GO | 3GO | 3GO |
| | | | Content (parts by mole) | 30 | 20 | 20 | 20 |
| | | Thickness (μm) | | 330 | 330 | 330 | 330 |
| | First layer | Polyvinyl acetal ionomer resin | Average polymerization degree of PVA | — | 1700 | 1700 | — |
| | | | Content of hydroxyl group (mol %) | — | 14.1 | 6.1 | — |
| | | | Acetalization degree (mol %) | — | 66.2 | 60.2 | — |
| | | | Acetylation degree (mol %) | — | 12.1 | 12.1 | — |

TABLE 2-continued

| | | | Example 4 | Comparative Example 2 | Comparative Example 3 | Comparative Example 4 |
|---|---|---|---|---|---|---|
| | | Content of acid group (mol %) | — | 3.8 | 10.8 | — |
| | | Kind of acid | — | Carboxylic acid | Carboxylic acid | — |
| | | Metal species for ionomerization | — | — | Na | — |
| | | Degree of neutralization (%) | — | — | 62 | — |
| | | Content (parts by weight) | — | 100 | 100 | — |
| | (Meth)acrylic ionomer resin | Ethyl acrylate (wt %) | 97 | — | — | 97 |
| | | Acrylic acid (wt %) | 3 | — | — | 3 |
| | | Content of acid group (mol %) | 4 | — | — | 4 |
| | | Kind of acid | Carboxylic acid | — | — | Carboxylic acid |
| | | Metal species for ionomerization | Na | — | — | Na |
| | | Degree of neutralization (%) | 22 | — | — | 3 |
| | | Content (parts by weight) | 100 | — | — | 100 |
| | Plasticizer | Kind | — | 3GO | 3GO | — |
| | | Content (parts by weight) | — | 60 | 60 | — |
| | Thickness (μm) | | 100 | 100 | 100 | 100 |
| Third layer | Polyvinyl acetal resin | Average polymerization degree | 800 | 1700 | 1700 | 1700 |
| | | Content of hydroxyl group (mol %) | 32.5 | 30.6 | 30.6 | 30.6 |
| | | Butyralization degree (mol %) | 66.3 | 68.5 | 68.5 | 68.5 |
| | | Acetylation degree (mol %) | 1.2 | 0.9 | 0.9 | 0.9 |
| | | Content (parts by mole) | 100 | 100 | 100 | 100 |
| | Plasticizer | Kind | 3GO | 3GO | 3GO | 3GO |
| | | Content (parts by mole) | 30 | 30 | 30 | 30 |
| | Thickness (μm) | | 330 | 330 | 330 | 330 |
| | Thickness of second lamination glass member (mm) | | 1.0 | 1.0 | 1.0 | 1.0 |
| Evaluation | (1) Viscoelasticity | Tg (= tanδ peak temperature) (° C.) | −2 | −2 | −2 | −5 |
| | | Modulus of elasticity (20° C.) | 17.2 MPa | 13.5 MPa | 30.5 MPa | 14.2 MPa |
| | (2) Flexural rigidity | Judgement | ○ | x | ○ | x |
| | (3) Sound insulating property | Judgement | ○ | ○ | x | ○ |
| | (4) Penetration resistance | Judgement | ○ | x | x | x |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (first layer)
11a: First surface
11b: Second surface
21: First lamination glass member
22: Second lamination glass member
31: Laminated glass
31A: Laminated glass

The invention claimed is:

1. An interlayer film for laminated glass having a one-layer or two or more-layer structure, the interlayer film comprising a first layer including an ionomer resin containing polyvinyl acetal into which an acid group is introduced, or containing a (meth)acrylic resin into which an acid group is introduced,
the ionomer resin having a content of the acid group of 1.5% by mole or more and 10% by mole or less,
the ionomer resin having a degree of neutralization of 10% or more and 90% or less,
the first layer having a glass transition point within a temperature range between −20° C. and 0° C.

2. The interlayer film for laminated glass according to claim 1, wherein the ionomer resin is a polyvinyl acetal ionomer resin or a (meth)acrylic ionomer resin.

3. The interlayer film for laminated glass according to claim 1, wherein the first layer contains a plasticizer.

4. The interlayer film for laminated glass according to claim 1, wherein a content of the plasticizer relative to 100 parts by weight of the ionomer resin is 10 parts by weight or more.

5. The interlayer film for laminated glass according to claim 1, comprising a second layer containing a resin,
the second layer being arranged on a first surface side of the first layer.

6. The interlayer film for laminated glass according to claim 5, comprising a third layer containing a resin,
the third layer being arranged on a second surface side opposite to the first surface of the first layer.

7. The interlayer film for laminated glass according to claim 6, wherein
the second layer contains a plasticizer, and
the third layer contains a plasticizer.

8. The interlayer film for laminated glass according to claim 1, wherein the interlayer film for laminated glass is used for obtaining laminated glass by being arranged between a first glass plate having a thickness of 1.3 mm or less, and a second glass plate.

9. A laminated glass comprising:
a first lamination glass member;
a second lamination glass member; and
the interlayer film for laminated glass according to claim 1,
the interlayer film for laminated glass being arranged between the first lamination glass member and the second lamination glass member.

* * * * *